(12) United States Patent
Aruga et al.

(10) Patent No.: US 9,373,150 B2
(45) Date of Patent: Jun. 21, 2016

(54) PROJECTOR AND CONTROL METHOD FOR A PROJECTOR WHICH PROJECTS AN IMAGE TOGETHER WITH ANOTHER PROJECTOR CONNECTED THERETO

(71) Applicant: SEIKO EPSON CORPORATION, Tokyo (JP)

(72) Inventors: Tadanori Aruga, Torrance, CA (US); Toru Katahira, Matsumoto (JP); Yutaka Yasuda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 252 days.

(21) Appl. No.: 13/853,449

(22) Filed: Mar. 29, 2013

(65) Prior Publication Data

US 2013/0271475 A1 Oct. 17, 2013

(30) Foreign Application Priority Data

Apr. 16, 2012 (JP) ................................. 2012-092679

(51) Int. Cl.
*G06T 1/00* (2006.01)
*H04N 9/31* (2006.01)

(52) U.S. Cl.
CPC ................ *G06T 1/00* (2013.01); *H04N 9/3147* (2013.01); *H04N 2201/0032* (2013.01)

(58) Field of Classification Search
CPC ........................................................ G06T 1/00
See application file for complete search history.

(56) References Cited

U.S. PATENT DOCUMENTS

| 6,624,854 B1* | 9/2003 | Isogai et al. ................... 348/744 |
| 2001/0013843 A1 | 8/2001 | Fujiwara et al. |
| 2002/0159035 A1* | 10/2002 | Koyama et al. ................. 353/31 |
| 2005/0007561 A1 | 1/2005 | Koyama et al. |
| 2011/0298581 A1* | 12/2011 | Hsu ............................... 340/4.3 |

FOREIGN PATENT DOCUMENTS

| CN | 1365459 A | 8/2002 |
| JP | 2000-330201 A | 11/2000 |
| JP | A-2000-338941 | 12/2000 |
| JP | A-2001-272723 | 10/2001 |
| JP | A-2005-149253 | 6/2005 |
| JP | 2006-165949 A | 6/2006 |
| JP | 2009-253718 A | 10/2009 |

* cited by examiner

*Primary Examiner* — Joni Richer
*Assistant Examiner* — Grace Q Li
(74) *Attorney, Agent, or Firm* — Oliff PLC

(57) ABSTRACT

In the case where a projector is used in combination with another projector, individual use of only one projector is enabled. A slave projector operates together with a master projector. In this case, the operation methods to start up the projector are a first method in which only a first key is pressed, a second method in which the first key and a second key are pressed simultaneously, and a third method in which the first key and a third key are pressed simultaneously. When the slave projector detects a user's operation with a remote controller, if the operation is done by the first method or the second method, the slave projector ignores this operation. Meanwhile, if the operation is done by the second method, the slave projector starts up the own device irrespective of the command from the master.

6 Claims, 4 Drawing Sheets

PROJECTOR AND CONTROL METHOD FOR A PROJECTOR WHICH PROJECTS AN IMAGE TOGETHER WITH ANOTHER PROJECTOR CONNECTED THERETO

BACKGROUND

1. Technical Field

The present invention relates to control in the case where plural projectors are used in combination.

2. Related Art

JP-A-2000-338941 discloses control in the case where plural projectors project identical images. JP-A-2005-149253 discloses a projector having a mode in which the projector starts up individually and in a mode in which the projector starts up interlocking with another device.

Even in the case where a system in which plural projectors project identical images as described in JP-A-2000-338941 is used, the user may want to use one projector individually (or it may be convenient if one projector can be used individually) in some cases. However, in the related art, once such a system is constructed, it is assumed that plural projectors operate interlocking with each other. Therefore, it is difficult to cause one projector alone to operate.

For example, in the case where two projectors are used in combination, when the user carries out an operation on a remote (remote controller), it is common that a master-slave relation is set between the two projectors so that only the master projector accepts the operation while the slave projector is controlled to operate by the master projector. This is because if the two projectors accept the operation, which projector should execute processing corresponding to the operation is unclear. However, once such a master-slave relation is set, the slave projector cannot operate without being controlled by the master projector.

SUMMARY

An advantage of some aspects of the invention is that a technique that enables individual use of only one projector in the case where a projector is used in combination with another projector is provided.

An aspect of the invention is directed to a projector which projects an image together with another projector connected thereto and includes: an accepting unit which accepts an operation by a user and a command from the another projector; a storage unit which stores mode information indicating a control mode of the projector; and a processing executing unit, in the case where mode information indicating that the projector operates interlocking with the another projector is stored in the storage unit, the processing executing unit executes processing corresponding to the command irrespective of the operation when the command is accepted by the accepting unit and executes processing corresponding to a predetermined first operation accepted by the accepting unit irrespective of the command when the first operation is accepted by the accepting unit.

According to this projector, by predetermining the first operation, the projector can be used individually.

In a preferred embodiment, in the case where the first operation is accepted by the accepting unit, when a predetermined second operation is further accepted, the processing executing unit may ignore the second operation.

By doing so, control can be performed so as not to execute processing corresponding to a specific operation.

Also, in this case, the second operation may be an operation to change an operation mode employed when the projector projects an image.

By not executing the processing corresponding to such an operation, the operation mode employed when the projector projects an image does not change. Therefore, it is possible to make it easy for the projector to project an image, interlocking with the another projector again.

In another preferred embodiment, the first operation may be a wireless operation.

By doing so, it is not necessary to operate a button or the like provided on the projector body. Therefore, the first operation can be carried out without touching the projector body (that is, without moving the projector body).

In this case, in the case where the mode information indicating that the projector operates interlocking with the another projector is stored in the storage unit, when another operation different from the first operation is accepted by the accepting unit, the processing executing unit may ignore the operation.

By doing so, even when the first operation is a wireless operation, that is, an operation that plural projectors can accept simultaneously, it is possible to cause the another projector alone to execute processing corresponding to an operation that should be accepted by the another projector.

Another aspect of the invention is directed to a control method for a projector which accepts an operation by a user and a command from another projector connected thereto and projects an image together with the another projector, and includes: executing processing corresponding to the command irrespective of the operation when the command is accepted from the another projector, in the case where mode information indicating that the projector operates interlocking with the another projector is stored in a storage unit, and executing processing corresponding to the operation by the user irrespective of the command when a predetermined first operation is accepted.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Figure 1:
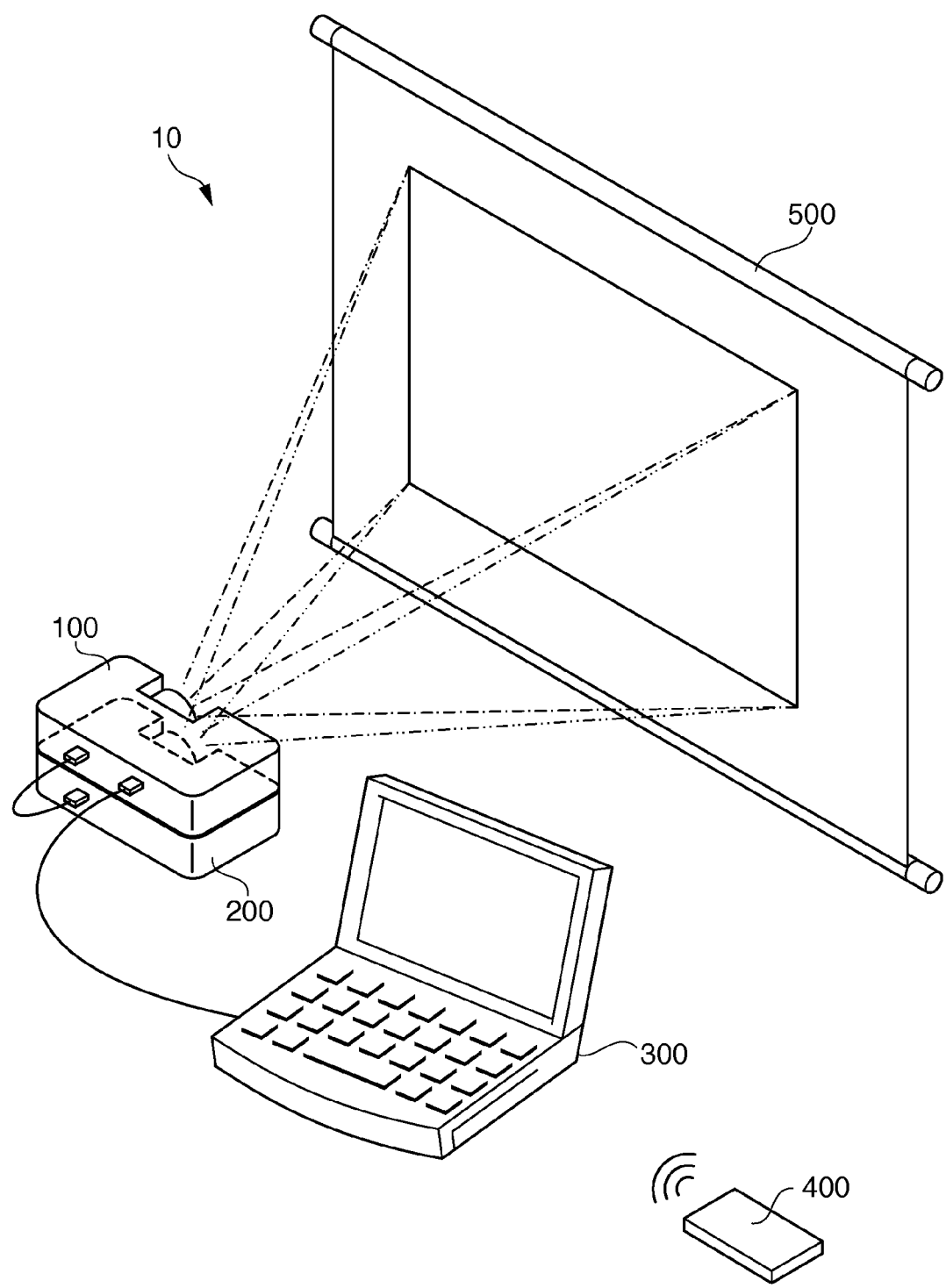
FIG. 1 shows the overall configuration of a display system.

FIG. 1 shows the overall configuration of a display system 10 as an embodiment of the invention. The display system 10 includes projectors 100, 200, a PC (personal computer) 300, a remote controller 400, and a screen 500. The screen 500 is not necessarily required and a wall surface or the like may be used instead.

In the display system 10, the two projectors 100, 200 project identical images and these images can be superimposed and displayed on the screen 500. As the image is thus displayed, the user can view a brighter image when a projector is used individually. However, in the display system 100, it is also possible to project an image by only one of the projectors 100, 200.

The projectors 100, 200 are devices which project an image. The projectors 100, 200 are connected to each other via a communication cable and are configured to be capable of transmitting and receiving data. This communication cable is, for example, USB (Universal Serial Bus) standard cable. The projectors 100, 200 are preferably fixed with a predetermined tool in such a way that the positional relation with each other does not change.

One of the projectors 100, 200 (in this example, the projector 100) is connected to the PC 300 via a communication cable. This communication cable is, for example, an RS-232C (Recommended Standard 232 version C) standard cable. Hereinafter, in some cases, the projector 100 connected to the PC 300 is referred to as a "master" and the projector 200 is referred to as a "slave". Here, a master means a main projector and a slave means a subordinate projector.

The PC 300 is an information processing device for supplying image data to the projectors 100, 200. The PC 300 is equivalent to an external device to the projectors 100, 200. The PC 300 may be a so-called tablet PC or smartphone, or may be a DVD (Digital Versatile Disc) player or the like. The PC 300 may function as an input device for inputting an operation to the projectors 100, 200.

The remote controller 400 is an input device for remotely operating the projectors 100, 200. The remote controller 400 is a so-called infrared remote controller and is configured to cast infrared rays in a predetermined pattern to enable operation of the projectors 100, 200. Hereinafter, a signal transmitted from the remote controller 400 is referred to as an "operation signal". While it is desirable that the remote controller 400 transmits an operation signal wirelessly, the remote controller 400 may also be configured to transmit an operation signal via a wire.

Figure 2:
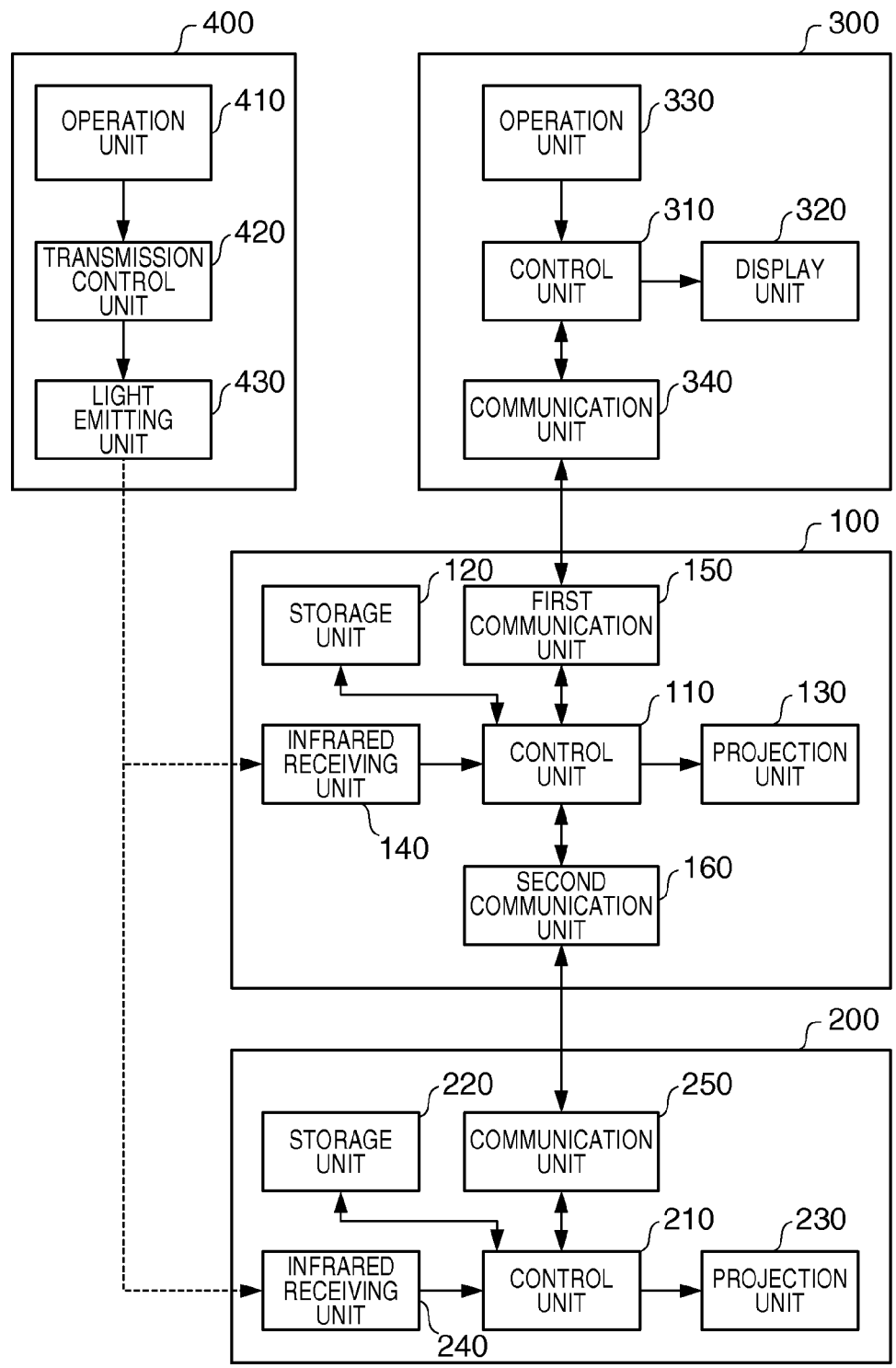
FIG. 2 is a block diagram showing the hardware configuration of a projector, a PC and a remote controller.

FIG. 2 is a block diagram showing the hardware configuration of the projectors 100, 200, the PC 300 and the remote controller 400. The projector 100 includes a control unit 110, a storage unit 120, a projection unit 130, an infrared receiving unit 140, a first communication unit 150, and a second communication unit 160. The projector 200 includes a control unit 210, a storage unit 220, a projection unit 230, an infrared receiving unit 240, and a communication unit 250. Although not shown here, the projectors 100, 200 may also have an operation panel to accept a user's operation.

The control units 110, 210 are units which control the operation of each unit in the projectors 100, 200, respectively. The control units 110, 210 have a processor and a memory and execute a program to realize various kinds of control. The control units 110, 210 accept a command corresponding to a user's operation and execute processing corresponding to the accepted command.

The storage units 120, 220 are units which store data. The storage units 120, 220 include a rewritable non-volatile recording medium such as flash memory. The storage units 120, 220 can store mode information indicating the control mode of the own device (projector). The mode information is data that can be recorded and rewritten according to the user's operation.

The control mode indicates how the projectors 100, 200 are controlled. The control mode in this embodiment includes three types, that is, "interlocking mode", "master-only mode" and "slave-only mode". Here, the interlocking mode is the control mode applied when the projector 100 and the projector 200 are made to operate, interlocking with each other. In this case, the slave projector 200 operates according to a command from the master projector 100 and ignores an operation signal that is not an operation signal corresponding to a specific operation. The master-only mode is the control mode applied when only the projector 100 is made to operate individually. Meanwhile, the slave-only mode is the control mode applied when only the projector 200 is made to operate individually.

The projection units 130, 230 are units which project an image corresponding to image data. The projection unit 130, 230 include, for example, a light source, a fan (for cooling the light source), a light modulation element such as a liquid crystal panel and a drive circuit thereof, and an optical system members such as a lens. However, the projection units 130, 230 may have any known configuration and the configuration of the light modulation element or the like is not particularly limited.

The infrared receiving units 140, 240 are units which receive an operation signal transmitted from the remote controller 400. The infrared receiving units 140, 240 have an infrared sensor. When the infrared sensor receives an operation signal, the infrared receiving units 140, 240 supply a key code corresponding to the received operation signal to the control units 110, 210. The key code is data (code) indicating which key is pressed on the remote controller 400. The key code in this embodiment is configured in such a way that simultaneous pressing of plural keys can also be identified.

The first communication unit 150 of the projector 100 is a unit which transmits data to and receives data from the PC 300. Meanwhile, the second communication unit 160 is a unit which transmits data to and receives data from the projector 200. The communication unit 250 of the projector 200 is connected to and communicates with the second communication unit 160 of the projector 100.

The projector 200 may have a unit which transmits data to and receives data from the PC 300, similarly to the projector 100. When the projector 200 has such a unit, the projector 200 may function as a master and the projector 100 may function as a slave. Also, both the projectors 100, 200 may have plural types of interfaces (input sources) to communicate with an external device.

The projectors 100, 200 can operate either in a normal mode or in a low-power mode. Here, the low-power mode refers to an operation mode in which the projector operates with restrained power consumption compared with the normal mode. For example, in the low-power mode, the projectors 100, 200 keep the light source and the fan from operating, and when the operation mode switches from the low-power mode to the normal mode, the projectors 100, 200 start driving the light source and the fan. However, the projectors 100, 200 are configured in such a way that the infrared receiving units 140, 240 operate even in the low-power mode and thus can detect an operation signal.

The PC 300 includes a control unit 310, a display unit 320, an operation unit 330, and a communication unit 340. The control unit 310 is a unit which controls the operation of each unit in the PC 300. The control unit 310 executes a predetermined program to realize transmission of various data or the like. The display unit 320 is a unit which displays an image and includes, for example, a liquid crystal display and a drive circuit thereof. The operation unit 330 is a unit which accepts a user's operation and includes, for example, a keyboard and a pointing device. The communication unit 340 is a unit which transmits data to and receives data from the first communication unit 150 of the projector 100.

The remote controller 400 includes an operation unit 410, a transmission control unit 420, and a light emitting unit 430. The operation unit 410 has plural keys that can be pressed, and detects a key that is pressed. The transmission control unit 420 is a unit which controls transmission of an operation signal. When the pressed key is detected (that is, the user's operation is detected), the transmission control unit 420 generates an operation signal indicating this operation and supplies the operation signal to the light emitting unit 430. The light emitting unit 430 is a unit which transmits the operation signal. The light emitting unit 430 has a light source which casts light with a predetermined wavelength (infrared rays) and emits light corresponding to the operation signal.

Figure 3:
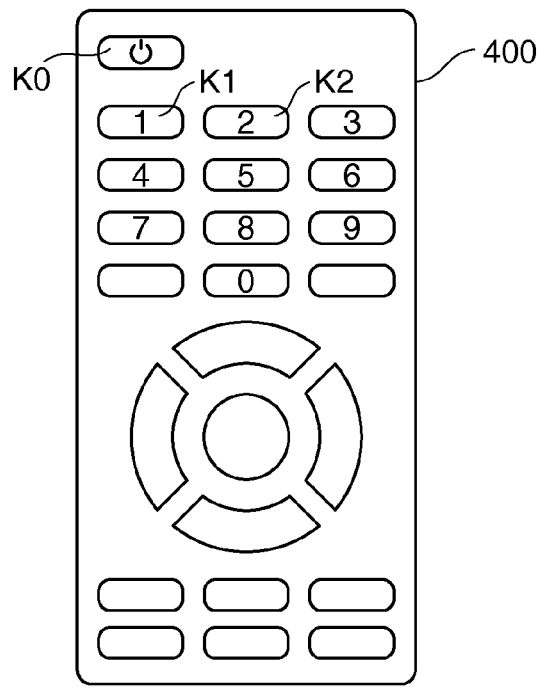
FIG. 3 shows the appearance of an operation unit.

FIG. 3 shows the appearance of the operation unit 410. The operation unit 410 has at least a power key K0 and numeric keys K1, K2. The power key K0 is a key to turn on the power of the projectors 100, 200 and thus starting up the projectors 100, 200. However, the term "startup" here means switching the operation mode from the low-power mode to the normal mode. That is, the projectors 100, 200 are capable of detecting an operation signal even before startup. The numeric keys K1, K2 are (part of) so-called ten-keys and are used in combination with the power key K0 in this embodiment.

The operation unit 410 may also have other keys. For example, the operation unit 410 may have a key to switch a page (image) to be displayed, a key to change the magnification when displaying an image, a key to carry out various settings related to an image to be displayed and the image quality thereof, and the like. When the projectors 100, 200 detect an operation corresponding to these keys, the projectors 100, 200 can execute processing corresponding to this operation.

Figure 4:
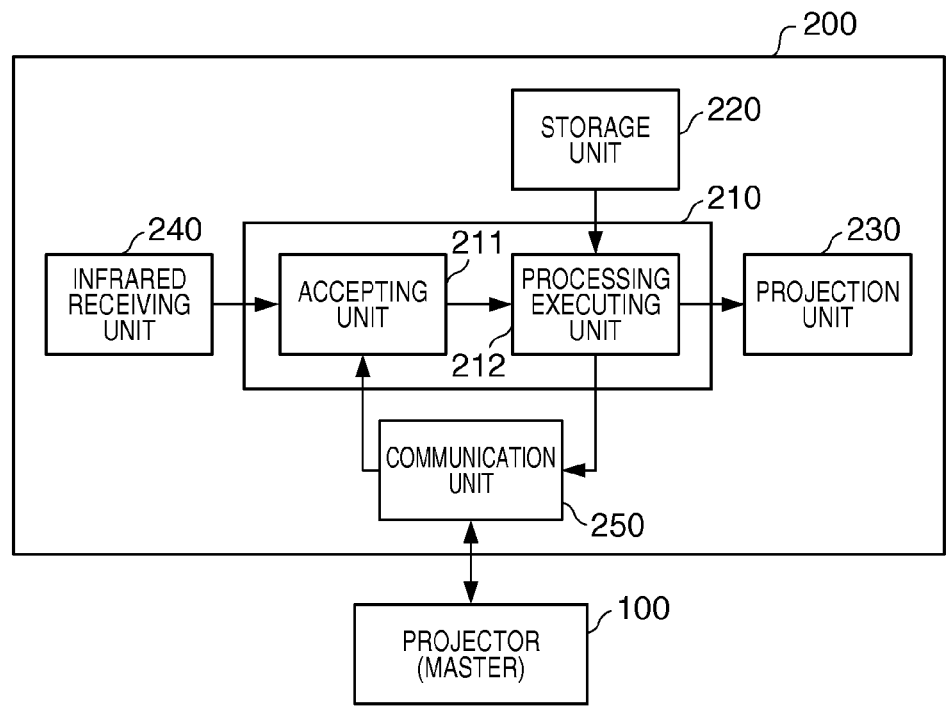
FIG. 4 is a block diagram showing the functional configuration of a projector (slave).

FIG. 4 is a block diagram showing the functional configuration of the projector 200. The control unit 210 of the projector 200 realizes a function equivalent to an accepting unit 211 and a processing executing unit 212. The accepting unit 211 is a unit which accepts a user's operation and a command from the projector 100. The accepting unit 211 acquires, from the infrared receiving unit 240, a key code corresponding to an operation signal received by the infrared receiving unit 240, and specifies the operation corresponding to the acquired key code, thus accepting the operation by the user using the remote controller 400. The accepting unit 211 also accepts the command from the projector 100 via the communication unit 250. The processing executing unit 212 is a unit which executes processing corresponding to the operation accepted by the accepting unit 211. However, the processing executing unit 212 refers to the mode information stored in the storage unit 220 and varies the processing to be executed, according to the mode information stored in the storage unit 220.

The configuration of the display system 10 is as described above. With this configuration, the user can operate the PC 300 and the remote controller 400 to cause the projectors 100, 200 to project an image and cause the image to be displayed on the screen 500. In this embodiment, the user first sets a control mode. The control mode may be set using either the PC 300 or the remote controller 400, or may be set using an operation panel if the operation panel is provided on the projectors 100, 200. Here, the interlocking mode is set as the control mode.

Also, the user allocates an ID to the projectors 100, 200 and thus sets a master-slave relation. Here, the master ID is "1" and the slave ID is "2", and the ID "1" is set to the projector 100 and the ID "2" is set to the projector 200. The ID is identification information indicating the subject of control in the interlocking mode and is stored in each of the storage units 120, 220. Referring to the ID, the projectors 100, 200 are configured to operate as a master if the ID value is "1", and operate as a slave if the value is "2".

When the projectors 100, 200 operate in the low-power mode and the user carries out an operation on the remote controller 400 to start up at least one of the projectors 100, 200, the projectors 100, 200 execute processing corresponding to the control mode that is set at the time and the ID allocated to the own device (that is, whether the own device is a master or a slave).

For example, if the control mode is the master-only mode, only the projector 100 starts up and the projector 200 does not start up. In this case, the projector 200 detects the operation signal but ignores the operation signal because the own device is a slave. Therefore, the operation mode of the projector 200 remains the low-power mode. Meanwhile, if the control mode is the slave-only mode, only the projector 200 starts up and the projector 100 does not start up. In this case, the operation mode of the projector 100 remains the low-power mode. In these cases, the operation to start up the projector is pressing the power key K0.

If the control mode is the interlocking mode, the projectors 100, 200 carry out the following operation. In this embodiment, there are three methods for starting up the projector in the case where the control mode is the interlocking mode. The first method is pressing the power key K0 alone, as in the other control modes. If the user carries out the operation by the first method, both the projectors 100, 200 start up. The second method is pressing the power key K0 and the numeric key K1 simultaneously. If the user carries out the operation by the second method, only the projector 100 starts up. The third method is pressing the power key K0 and the numeric key K2 simultaneously. If the user carries out the operation by the third method, only the projector 200 starts up. That is, the second method and the third method are operation methods for temporarily starting up one of the projectors 100, 200 individually without rewriting the mode information in the case where the control mode is the interlocking mode.

Figure 5:
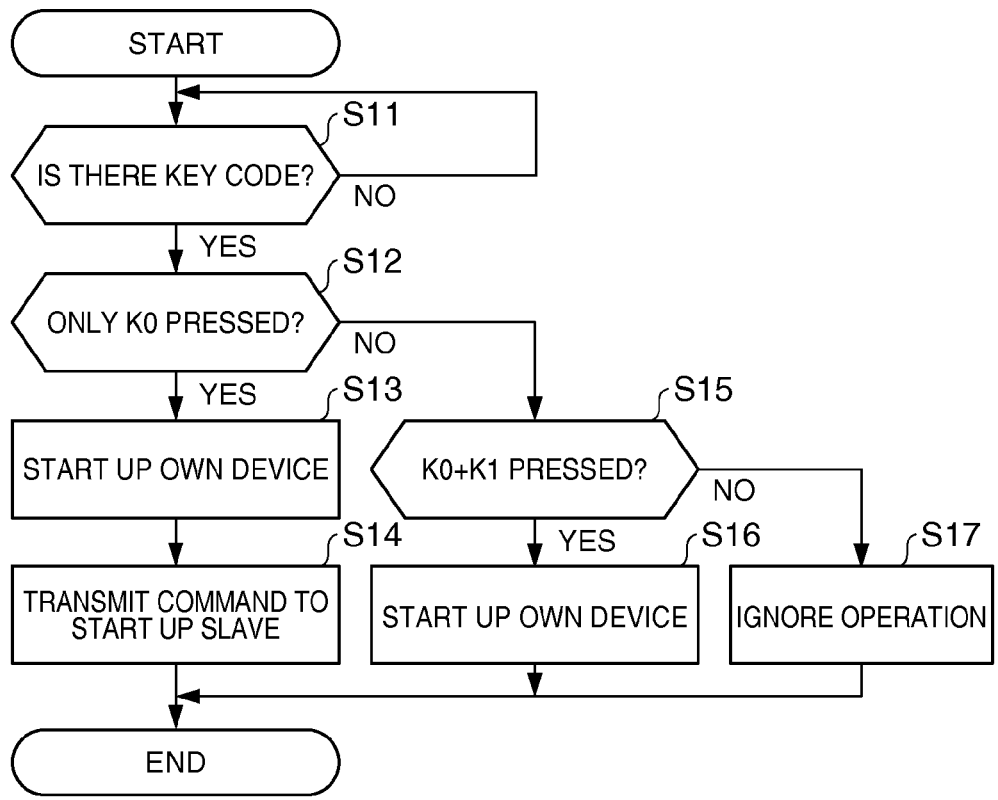
FIG. 5 is a flowchart showing the operation at the time of startup of a projector (master).

FIG. 5 is a flowchart showing the operation at the time of the startup of the projector 100 (master). The control unit 110 of the projector 100 repeats determining whether an operation signal is received and a key code is accepted or not, and thus stands by for startup (step S11). If a key code is accepted (S11: YES), the control unit 110 determines whether the key code indicates that only the power key K0 is pressed or not (step S12). That is, it is whether the user's operation is done by the first method or not.

If the user carries out the operation by the first method (S12: YES), the control unit 110 executes processing to start up the own device (step S13) and also transmits a command which instructs the projector 200 to start up, to the projector 200 (step S14). Specifically, the processing to start up the own device is processing to switch the operation mode from the low-power mode to the normal mode. Thus, the projectors 100, 200 can operate in the interlocking mode thereafter.

Meanwhile, if the user does not carry out the operation by the first method (S12: NO), the control unit 110 determines whether the operation is done by the second method or by the third method (step S15). If the user carries out the operation by the second method (S15: YES), the control unit 110 executes processing to start up the own device (step S16). The processing of step S16 is similar to the processing of step S13. However, unlike the case of step S13, the control unit 110 at this time does not cause the projector 200 to start up. At this time, the control unit 110 does not rewrite the mode information, either. Thus, the projector 100 can temporarily operate in the master-only mode while the mode information indicates the interlocking mode.

Meanwhile, if the user carries out the operation by the third method (S15: NO), the control unit 110 ignores this operation (step S17). This is because this operation is an operation carried out by the user to the slave projector 200. The control unit 110 does not rewrite the mode information at this time, either.

Figure 6:
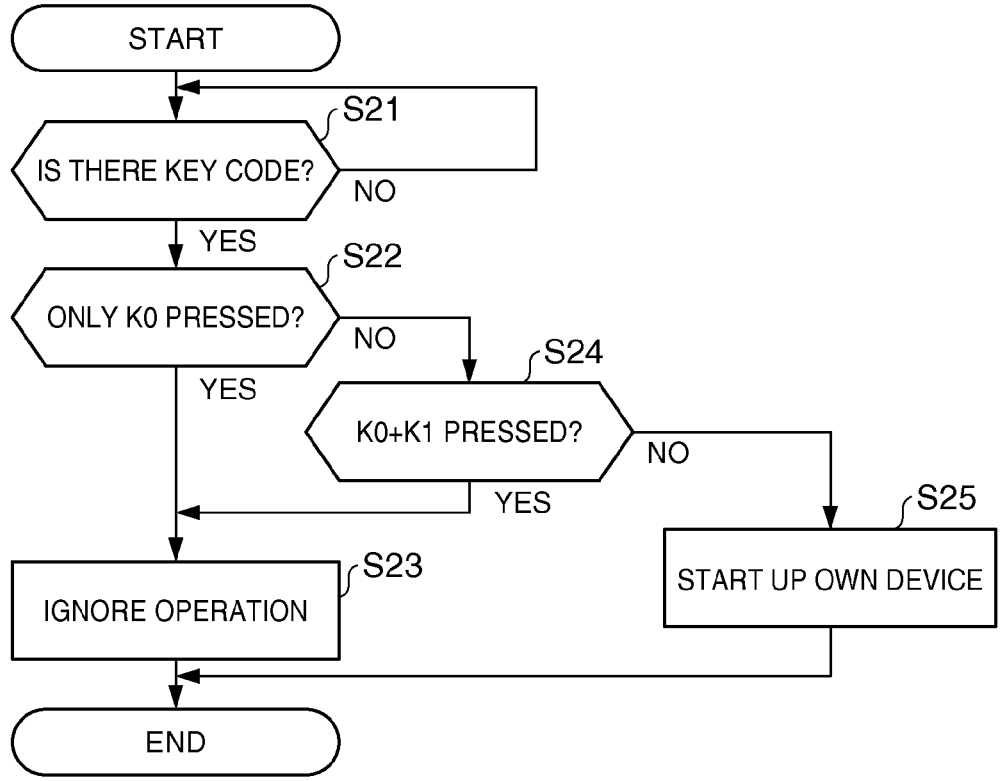
FIG. 6 is a flowchart showing the operation at the time of startup of a projector (slave).

Next, FIG. 6 is a flowchart showing the operation at the time of startup of the projector 200 (slave). The control unit 210 of the projector 200 repeats determining whether an operation signal is received and a key code is accepted or not, and thus stands by for startup (step S21). The processing of step S21 is similar to the processing of step S11. If a key code is accepted (S21: YES), the control unit 210 determines whether the key code indicates that only the power key K0 is pressed or not (that is, whether the operation is done by the first method or not) (step S22).

If the user carries out the operation by the first method (S22: YES), the control unit 210 ignores this operation (step S23). This is because the control mode at this time is the interlocking mode and the projector 200 is a slave. In this case, the projector 200 operates in response to a command from the projector 100.

Meanwhile, if the user does not carry out the operation by the first method (S22: NO), the control unit 210 determines whether the operation is done by the second method or by the third method (step S24). If the user carries out the operation by the second method (S24: YES), the control unit 210 ignores this operation (step S23). This is because this operation is carried out by the user to the master projector 100.

Meanwhile, if the user carries out the operation by the third method (S24: NO), the control unit 210 executes processing to start up the own device (step S25). At this time, the projector 200 starts up individually. That is, the projector 100 does not start up at this time. The control unit 210 does not rewrite the mode information at this time.

As described above, according to this embodiment, by carrying out a predetermined operation in the case where the projectors 100, 200 are configured to interlock with each other, it is possible to use one of these projectors individually. Thus, in the case where the projectors operate in the interlocking mode and display a brighter image than in the case where one projector is individually used, it is possible to use only one projector according to need and utilize this system in various applications. For example, if brightness is not required of the image to be displayed, one of the projectors 100, 200 is kept from starting up. Thus, power consumption or the like can be restrained, compared with the case where these projectors are used in combination.

Also, according to the embodiment, either projector can be made to operate individually without changing the mode information or without changing the wiring in the projectors 100, 200. Particularly, in the case where images projected from the projectors 100, 200 are superimposed and thus displayed, as in this embodiment, alignment or the like between the respective images is needed. Therefore, once the system is constructed, it can be said that no change in the positions of (or relative positional relation between) the projectors 100, 200 is desirable. According to the embodiment, since either one of the projectors 100, 200 can be made to operate individually just by operating the remote controller 400, the user need not touch the projectors 100, 200.

Moreover, in the case of the embodiment, even if the master projector 100 cannot operate because of a failure or the like, the projector 200 can be made to start up. Meanwhile, in a system configured in such a way that plural projectors are interlocked with each other, in the case where a slave only accepts a command from a master and does not directly accept a user's operation, if the master becomes unable to operate, the slave cannot be made to operate unless the system configuration is canceled. The term 'cancel' here means to rewrite the mode information or to disconnect the wiring between the master and the slave.

Also, the display system 10 may be used with the projectors 100, 200 suspended from the ceiling (installed on the ceiling of a room with an appliance or the like). In such a case, it is particularly difficult to work on the projectors 100, 200 by directly touching the projectors. Therefore, it can be said that the configuration of this embodiment is also advantageous in the case where the projectors are used in such suspended state.

MODIFICATIONS

The invention is not limited to the above embodiment and can be carried out in various forms as follows. The invention can also be carried out as a combination of some of the following modifications according to need.

(1) In the above embodiment, there are three types of control modes, that is, the "interlocking mode", the "master-only mode" and the "slave-only mode". However, the control method in the invention may also simply indicate whether to interlock or not (that is, two types). In this case, it suffices that only one predetermined projector can operate individually.

(2) The projector 200 may be configured not to detect an operation signal in the case where the projector 200 is set as a slave. That is, in the display system 10, the projector which detects an operation signal may be the master projector 100 alone. In this case, the projector 200 may be configured to receive a key code from the projector 100 via the communication cable.

(3) In the invention, the first operation, that is, the operation that triggers the slave to execute processing irrespective of the command from the master, is not limited to the above key operation. For example, the first operation may be an operation to press a single predetermined key, instead of pressing plural keys simultaneously. Also, the first operation may be carried out by the PC 300 instead of the remote controller 400. If an operation panel is provided on the projectors 100, 200, the first operation may be carried out using the operation panel.

(4) The processing executed by the slave projector 200 according to the first operation irrespective of the command from the master projector 100 is not limited to the startup processing (that is, the processing to switch the operation mode from the power-saving mode to the normal mode). The projector 200 can also execute other processing than the startup processing, by accepting the first operation. The processing thus executed by the projector 200 may include, for example, processing to adjust a color mode (image quality according to the scene used), brightness, contrast, color tone, sharpness or the like, processing to set an aspect ratio, processing to carry out keystone correction, processing to initialize the above various adjustment and setting contents, and the like.

The projector 200 may also be configured to execute a part of the processing executable according to the user's operation, only in response to a command from the projector 100 during the interlocking, and not to execute such processing individually. In this case, even if the projector 200 accepts an operation for the projector 200 to execute such processing individually (second operation), the projector 200 ignores this operation. Such processing related to the operation to be ignored may be, for example, processing to change the operation mode employed when the projector 200 projects an image, such as processing to execute keystone correction. This is because if such processing (processing to change the position or image quality of an image) is executed by only one projector, mismatching or misalignment occurs between the images projected by the two projectors and a desired image cannot be displayed when the projectors interlock again with each other to display an image.

With respect to the processing to change the position or image quality of an image, the projectors 100, 200 may store a setting value for each of the case where the projectors interlock with each other to operate and the case where each projector operates individually, and may read out and apply the setting value corresponding to the case at the time. Thus, even if the operation switches between the case where the projectors interlock with each other to operate and the case where each projector operates individually, a desired image can be displayed.

(5) The invention is not limited to the case where the two projectors project identical images, and can be applied to other cases. For example, the invention can be applied to the case where images projected by the two projectors are lined up vertically or horizontally so that a vertically longer or horizontally longer image can be displayed than in the case where an image projected by one projector. Alternatively, the invention can be applied to a display system where an image for the right eye is projected by one projector while an image for the left eye is projected by the other projector so that the user can have a stereoscopic vision. In this case, for example, a stereoscopic image is projected when the two projectors are used, whereas a normal (non-stereoscopic) image is projected when only one projector is used.

Also, the invention may include the use of any plural projectors and the number of projectors used is not limited to two. For example, the invention may use three projectors. The control mode in this case may include a mode in which only one projector is used, a mode in which two projectors are used, and a mode in which three projectors are used.

(6) The invention is not limited to projectors and a display system including projectors, and can also be provided as a control method for causing at least one of two projectors to display an image and as a program for causing projectors to execute such control method. Also, a program according the invention may be supplied to a projector via a network or other communication measures and may become available when installed.

The entire disclosure of Japanese Patent Application No.2012-92679, filed Apr. 16, 2012 is expressly incorporated by reference herein.

What is claimed is:

1. A projector which projects an image together with another projector connected thereto, comprising:
   an accepting unit which accepts an operation by a user and a command from the other projector;
   a storage unit which stores mode information indicating a control mode of the projector; and
   a processing executing unit, in the case where mode information indicating that the projector operates interlocking with the other projector is stored in the storage unit, the processing executing unit executes processing corresponding to the command irrespective of the operation when the command is accepted by the accepting unit and executes processing corresponding to a predetermined startup operation accepted by the accepting unit irrespective of the command in response to the startup operation being accepted by the accepting unit, wherein the projector retains a slave status and the other projector retains a master status.

2. The projector according to claim 1, wherein in the case where the startup operation is accepted by the accepting unit, when a predetermined second operation is further accepted, the processing executing unit ignores the second operation.

3. The projector according to claim 2, wherein the second operation is an operation to change an operation mode employed when the projector projects an image.

4. The projector according to claim 1, wherein startup operation is a wireless operation.

5. The projector according to claim 4, wherein in the case where the mode information indicating that the projector operates interlocking with the other projector is stored in the storage unit, when another operation different from the startup operation is accepted by the accepting unit, the processing executing unit ignores the operation.

6. A control method for a projector which accepts an operation by a user and a command from another projector connected thereto and projects an image together with the other projector, the method comprising:
   executing processing corresponding to the command irrespective of the operation when the command from the other projector is accepted, in the case where mode information indicating that the projector operates interlocking with the other projector is stored in a storage unit,
   executing processing corresponding to a predetermined startup operation by the user irrespective of the command in response to the startup operation being accepted;
   wherein the projector retains a slave status and the other projector retains a master status.

* * * * *